(12) United States Patent
Tarozzo et al.

(10) Patent No.: US 8,435,458 B2
(45) Date of Patent: May 7, 2013

(54) WALL SYSTEM FOR CATALYTIC BEDS OF SYNTHESIS REACTORS AND RELATIVE PRODUCTION PROCESS

(75) Inventors: Mirco Tarozzo, Ligornetto (CH); Ermanno Filippi, Castagnola (CH); Enrico Rizzi, Casnate con Bernate (IT)

(73) Assignee: Ammonia Casale S.A. (CH)

( * ) Notice: Subject to any disclaimer, the term of this patent is extended or adjusted under 35 U.S.C. 154(b) by 131 days.

(21) Appl. No.: 12/667,315

(22) PCT Filed: Jun. 30, 2008

(86) PCT No.: PCT/EP2008/005312
§ 371 (c)(1),
(2), (4) Date: May 3, 2010

(87) PCT Pub. No.: WO2009/003663
PCT Pub. Date: Jan. 8, 2009

(65) Prior Publication Data
US 2010/0278701 A1 Nov. 4, 2010

(30) Foreign Application Priority Data
Jul. 4, 2007 (EP) ..................................... 07013091

(51) Int. Cl.
*B01J 8/00* (2006.01)
*B01J 8/02* (2006.01)
*B01J 8/04* (2006.01)
*B01J 8/44* (2006.01)
*B01J 35/02* (2006.01)
*B01J 19/00* (2006.01)
*B01J 19/32* (2006.01)

(52) U.S. Cl.
USPC ........... 422/218; 422/129; 422/187; 422/211; 422/310; 422/311; 422/220; 422/600; 422/630; 422/631; 422/636; 422/237

(58) Field of Classification Search ................. 422/129, 422/187, 211, 218, 310, 311, 220, 236, 238, 422/239, 600, 630, 631, 636, 637
See application file for complete search history.

(56) References Cited

U.S. PATENT DOCUMENTS

| | | | |
|---|---|---|---|
| 4,849,206 A * | 7/1989 | Zardi | 423/659 |
| 5,209,908 A | 5/1993 | Koves et al. | |
| 5,587,077 A * | 12/1996 | Aaltonen et al. | 210/498 |
| 5,827,485 A * | 10/1998 | Libal et al. | 422/179 |
| 2008/0107575 A1* | 5/2008 | Vetter et al. | 422/211 |

FOREIGN PATENT DOCUMENTS

| | | |
|---|---|---|
| EP | 0402783 A2 | 12/1990 |
| EP | 1818094 A1 | 8/2007 |
| JP | 2007056474 A | 3/2007 |

* cited by examiner

*Primary Examiner* — Jill Warden
*Assistant Examiner* — Natasha Young
(74) *Attorney, Agent, or Firm* — Akerman Senterfitt (57) ABSTRACT

A system (8; 9; 50) is described of walls for catalytic beds of synthesis reactors (1), in which there is a wall (14) in direct contact with a catalytic bed (7) for containing it, said wall (14) having a plurality of portions (17) permeable to the gases and a plurality of portions (19; 54; 55) impermeable to the gases, said portions (17) permeable to the gases being equipped with slits (18; 52, 53; 60; 70) of a size such as to allow the free passage of the synthesis gases through them but not the passage of the catalyst, in which the slits are obtained with milling, water cutting or electro-erosion processing.

14 Claims, 6 Drawing Sheets

WALL SYSTEM FOR CATALYTIC BEDS OF SYNTHESIS REACTORS AND RELATIVE PRODUCTION PROCESS

FIELD OF APPLICATION

The present invention, in its most general aspect, concerns the field of heterogeneous catalytic synthesis of chemical compounds through reactors equipped with fixed catalytic beds crossed by a gaseous flow of synthesis gas particularly with radial, axial-radial or axial flow.

In particular the present invention concerns a system of walls for the containment of the catalytic bed of a reactor of the type quoted above, and a reactor comprising said system of walls. The invention moreover regards a process for making said wall system.

PRIOR ART

It is known that reactors with fixed catalytic beds, used for heterogeneous catalytic synthesis of chemical compounds like for example ammonia and methanol, comprises internal wall systems in particular for the distribution of the synthesis gases inside the catalytic bed. Such wall systems are designed and built so as to satisfy certain functional requirements necessary for the synthesis reactor to operate correctly, including:

permeability to the gaseous flow of synthesis gases with a suitable head loss, such as to allow optimal distribution thereof on the entire catalytic bed, containment and mechanical support of the catalytic mass so as to balance the thrusts resulting from the mass of the catalyst (due to its weight and to the differences in thermal expansion between catalyst and containment walls) and the thrusts of the gases crossing the catalytic bed.

More specifically, in order to satisfy the aforementioned requirements, it is known to use wall systems for catalytic beds consisting of a plurality of walls each carrying out one or more of the aforementioned functions.

FR 2615407, for example, discloses a tubular module wall system for the distribution of synthesis gas in catalytic beds.

Said system however has many drawbacks, including a certain structural and assembly difficulty and sensitivity to the phenomenon of nitriding in reactors for the synthesis of ammonia. To remedy the latter problem, it is necessary to use very expensive materials like Inconel® special steels (iron-nickel alloys) for low-thickness elements, in order to keep a satisfactory mechanical strength during the operation of the reactor; it is however necessary to make heterogeneous welds (i.e. between different materials) which are subject to cracks or breaks due to thermal stress caused by the different thermal expansion coefficients of the materials used.

SUMMARY OF THE INVENTION

The technical problem underlying the present invention is that of providing a system of walls for catalytic beds of synthesis reactors capable of satisfying the above-listed requirements, in particular permeability to the synthesis gas and adequate support of the catalytic mass, as well as providing a structural process suitable for making said wall systems.

This problem is solved by a system of walls for catalytic beds of chemical reactors characterised in that it comprises a wall of predetermined thickness in direct contact with a catalytic bed for containing it, said wall having a plurality of gas-permeable portions and a plurality of gas-impermeable portions, each of said gas-permeable portions being equipped with a plurality of slits having a size such as to allow the free passage of the synthesis gases but avoid the passage of the catalyst, wherein said slits are obtained with a machining method chosen between milling, water cutting, electro-erosion.

Said wall substantially acts as a containment body of the catalyst, and at the same time permits the flow of gas through said permeable portions equipped with slits, so that the gas can come into contact with the catalyst itself.

Preferably, according to the invention, the containment wall has slits more extended, in the longitudinal direction, on a side intended to be in contact with the catalyst, obtained with a milling process wherein a milling disc is used (or a plurality of milling discs), of appropriate diameter, and the slits are made with the milling cutter which does not cross through the wall as far as its diameter. In such a way, the slits are more ample, in the longitudinal direction of the cut, on the milling cutter entrance side with respect to the milling cutter exit side. By arranging the wall inside the reactor such that the surface with longer slits (i.e. that of milling cutter entrance during the construction) faces the catalyst, a positive effect has been found in terms of process efficiency, since the greater length of the notches at least partly compensates for the passage section reduction caused by catalyst grains, which can block the notches.

According to another aspect of the invention, the wall has slightly flared slits obtained with water cutting, the slits thus being narrower on one side of the same wall. It has been found that it is preferable to position the wall with the narrower slit side towards the catalyst, obtaining the effect of facilitating the expulsion of possible catalyst particles and reducing the possibility of slit obstruction.

The above described processing techniques have shown to be particularly effective for making walls with slits for the passage of the gases according to the invention, with some advantages compared to techniques, e.g. laser cutting, which can also be used.

An object of the invention is therefore also a process for making a containment wall of a catalytic bed, for chemical reactors, comprising the step of machining a flat metal sheet, intended to form said wall or a section thereof, by means of a machining technique chosen from among milling, water cutting and electro-erosion, obtaining a plurality of slits having dimensions such to permit the free passage of the gases through them, although avoiding the passage of the catalyst.

According to one aspect of the invention, it is provided to obtain said slits by milling and with control of the milling cutter (or plurality of milling cutters) so that the milling cutter does not cross through the wall as far as its diameter, thus obtaining more extended slits, in the longitudinal direction of the cut, on the milling cutter entrance side with respect to the milling cutter exit side. Preferably, multiple tools are used, essentially comprising a shaft bearing a certain number of milling discs.

The milling processing further has the advantages of low heat generation (less for example than laser cutting); possibility to make slits of optimal width as a function of the synthesis process to which the reactor is intended (ammonia, methanol, etc.); good finishing level, which generally does not require further finishing, except for a brushing treatment to remove shavings.

With reference to the water cutting, the invention preferably provides the use of a multi-head cutting machine, for example with 2, 4, 6 or 8 nozzles cutting in parallel. A single head machine, however, can also be employed.

Water cutting has several advantages: the heat generation is almost null, thus having no deformation; it does not form any (raze; it allows to make slits of very small size (even<5 mm); the process is not highly sensitive to possible material non-uniformity; it allows improved process control.

It should be noted that the progressive wear of the water cutting nozzle can be compensated by acting appropriately on the cutting parameters of the machine, and does not involve substantial risks. With traditional cutting tools, on the other hand, the tool wear cannot be easily compensated for, and may cause sudden breaking of the tool itself, even ruining (some times irreparably) the work piece.

Water cutting, moreover, also permits obtaining with a single process the piercing, trimming etc. of the edges of the plates intended to form the aforesaid containment wall.

According to further embodiment of the invention, electro-erosion processing can also be effectively employed.

The wall preferably has a modular structure, in particular for facilitating the insertion by means of manhole in a pre-existing reactor. The above described processing steps are hence equally applied to wall modules or sections.

Further preferred aspects of the system of walls according to the invention are now described.

Preferably, the aforesaid containment wall has a thickness in the range of 1-10 mm, preferably 3-6 mm. Preferably, the aforementioned containment wall also constitutes a mechanical support for said catalytic bed through said portions impermeable to the gases. Preferably the aforementioned containment wall consists of a plurality of modules fixed together in which each module comprises said portions permeable to the gases and/or said portions impermeable to the gases.

The slits can be any shape, rectilinear or curvilinear and can be arranged in any way, for example they can have a longitudinal or transversal extension with reference to the axis of the reactor in any combination of slits—rectilinear, curvilinear or both.

According to a preferred embodiment of the invention, the system of walls according to the invention further comprises a distribution wall equipped with gas-permeable portions arranged in spaced relationship with said containment wall so as to create an interspace with it.

Preferably, the gas-permeable portions of the distribution wall consist of a plurality of holes made in said wall. Preferably, said gas-permeable portions of the distribution wall are arranged side-by-side towards the portions impermeable to the gases of containment wall so as to avoid the direct impact of the synthesis gases that cross the gas-permeable portions with the catalyst. Differently, in the case of the systems of walls of the aforementioned prior art, it is not possible to protect the catalyst from the direct impact of the synthesis gases coming out from the distribution wall.

The aforementioned distribution wall is per se conventional and can be equipped with spacing means, also of the conventional type, to stably maintain the containment wall of the catalyst and the distribution wall in the desired spaced relationship also in conditions of great mechanical or thermal stress to which said walls can be subjected inside the reactor in its normal operating conditions.

The main advantage of the system of walls according to the invention lies in the simplicity in making it since the gas-permeable portions, in other words the aforementioned slits, are formed directly in the thickness of the modules of the containment wall of the catalyst therefore without having to carry out a plurality of welds as required to make the grids in the system of walls of the aforementioned prior art.

Moreover, the presence of portions impermeable to the gases gives the aforementioned containment wall adequate mechanical strength that makes it in general suitable for withstanding the mechanical and thermal stresses in normal operating conditions of the reactor. Advantageously, such mechanical strength can also be suitable for the specific requirements of use in the reactor for which it is intended by suitably adjusting the thickness of the containment wall of the catalyst so as to satisfy such requirements.

For example, the thickness of the containment wall can be such that such a wall is also able to act as a support of the catalyst through its portions impermeable to the gases. Alternatively, the catalyst support function can be partially or completely carried out by the distribution wall by suitably adjusting the thickness thereof so as to have a suitable mechanical strength.

It should also be noted that in the system of walls according to the invention it is not necessary to use expensive materials either for the containment wall or for the distribution wall, which means a substantial saving in production costs.

For example, in the case of use of the system of walls according to the invention in a reactor for ammonia synthesis, it is possible to use a relatively inexpensive material, like for example stainless steel, to make both the containment and distribution walls with this obtaining suitable mechanical strength and resistance to nitriding effects. In particular the negative effects on mechanical strength deriving from surface nitriding can be compensated by suitably adjusting the thickness of said walls or, in the case of the containment wall of the catalyst, the distribution and the number of portions permeable to the gases and of portions impermeable to the gases.

Differently, in the case of wall systems of the prior art it is necessary to use very expensive materials that are highly resistant to nitriding like for example the special steels Inconel® (iron-nickel alloys), for the low-thickness elements (for example the welded rods of the grid), in order to keep a satisfactory mechanical strength during the operation of the reactor.

It should also be noted that, advantageously, the slits of the portions permeable to the gases can be arranged according to a predetermined order and number along the entire containment wall of the catalyst to satisfy contingent and specific requirements, without substantially compromising the mechanical strength of said wall by doing so.

The present invention also concerns a reactor for the heterogeneous synthesis of chemical compounds comprising a shell closed at the opposite ends by respective base plates, an opening for the inlet of synthesis gases, an opening for the outlet of the reaction products, at least one catalytic bed and at least one system of walls for said at least one catalytic bed as described above.

The reactor according to the invention can be of the type with crossing of the gases in the catalytic bed or in the catalytic beds with radial, axial-radial or axial flow.

In particular, in the case of reactors with crossing of said at least one catalytic bed by the gases with radial or axial-radial flow, the system of walls according to the invention can be arranged on an inlet side of the gases in said at least one catalytic bed and/or on an outlet side of the gases from said at least one catalytic bed with the respective containment walls in contact with the catalyst.

Advantageously, with the system of walls according to the invention, an optimal distribution of the synthesis gases is obtained, on the gas inlet side, inside the respective catalytic bed thanks to the fact that the gases crossing the holes of the distribution wall undergo a load loss in the interspace between the distribution wall and the containment wall, which allows the inlet speed of said gases into the catalytic bed to be reduced.

However, it should be noted that other embodiments of the reactor are also possible in which the distribution wall of the system of walls according to the invention is left out on the gas inlet side in the respective catalytic bed or on the gas outlet side from the respective catalytic bed.

In the reactor according to the invention, the systems of walls of the catalytic beds are supported in a conventional manner inside the reactor. In the case in which a cartridge for containing said catalytic beds permeable to the gases in envisaged inside the reactor, the systems of walls for gas inlet according to the invention are arranged at the inner wall of said cartridge with the respective containment walls in contact with the catalyst of the respective catalytic beds.

In the case of reactors with crossing of said at least one catalytic bed by the gases with axial motion, the system of walls according to the invention can be applied onto the upper gas-inlet base plate and/or onto the lower gas-outlet base plate of the respective catalytic bed.

Advantageously, on the upper gas-inlet base plate, the system of walls according to the invention can be used in place of the usual protective grids of the catalyst at the same time obtaining an optimal distribution of the synthesis gases in the catalytic bed.

Further characteristics and advantages of the present invention shall also become clear from the following description of some preferred example embodiments thereof, given for indicating and not limiting purposes, with reference to the attached figures.

DETAILED DESCRIPTION

With reference to the aforementioned figures, a reactor for the heterogeneous synthesis of chemical compounds is globally indicated with 1.

The reactor 1 is particularly suited for the synthesis of ammonia from synthesis gases comprising hydrogen and nitrogen.

Figure 1:
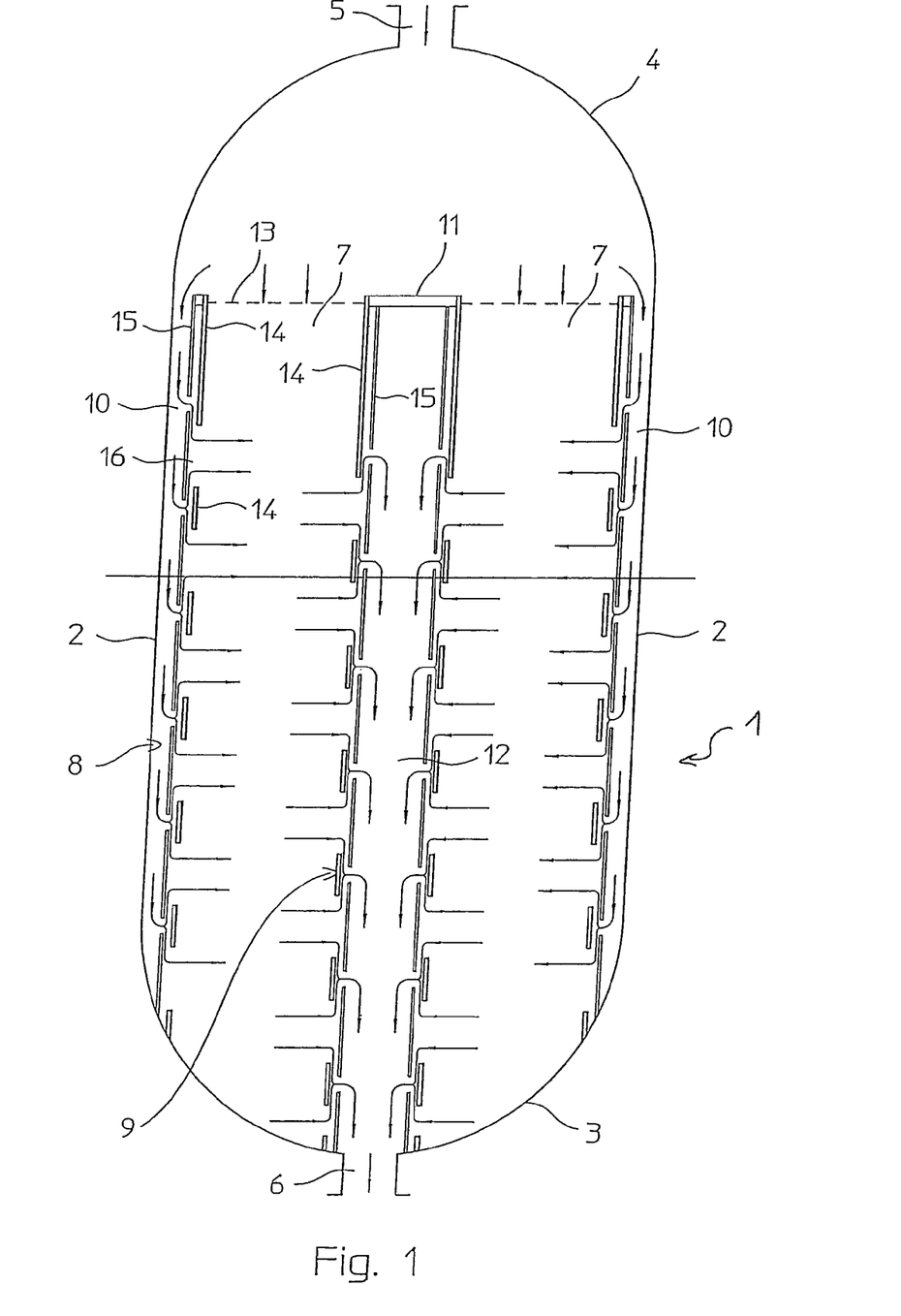
FIG. 1 schematically shows a longitudinal section view of a reactor for the heterogeneous synthesis of chemical compounds incorporating a system of walls for the inlet of gas into a catalytic bed and a gas outlet system from said catalytic bed according to the invention, FIG. 2 schematically shows a cross section view of the reactor of FIG. 1, FIG. 3 schematically shows a perspective view of a section of the system of walls for the inlet of gas and of the system of walls for the outlet of gas of the reactor of FIG. 1, FIG. 4 schematically shows a perspective view of a section of just the system of walls for the outlet of gas of the reactor of FIG. 1, FIG. 5 schematically shows a perspective view of a section of a system of walls for the outlet of gas from a catalytic bed according to a variant embodiment of the invention, and FIG. 6 schematically shows a detail of a system of walls according to a further embodiment of the present invention.

The reactor 1 comprises a substantially cylindrical shell 2 closed at the opposite ends by respective base plates, top 3 and bottom 4. The reactor 1 is also provided on the top base plate 4 with an opening 5 for the inlet of a gaseous flow of reactant gases and on the base plate 3 with an opening 6 for the outlet of a gaseous flow comprising the reaction products.

Inside the shell 2 an annular catalytic bed 7 is formed of the type with axial-radial crossing, defined at the side by respective systems of walls according to the invention, globally indicated with 8 and 9 respectively for the inlet and for the outlet of the gases from the catalytic bed 7. The relevant characteristics of the systems of walls 8 and 9 according to the invention shall be made clearer in the rest of the present description.

The catalytic bed 7 is not closed on top to allow it to be crossed axially by a portion of the flow of reactant gases and it is also delimited at the bottom by the bottom base plate 3 of the reactor 1.

Figure 2:
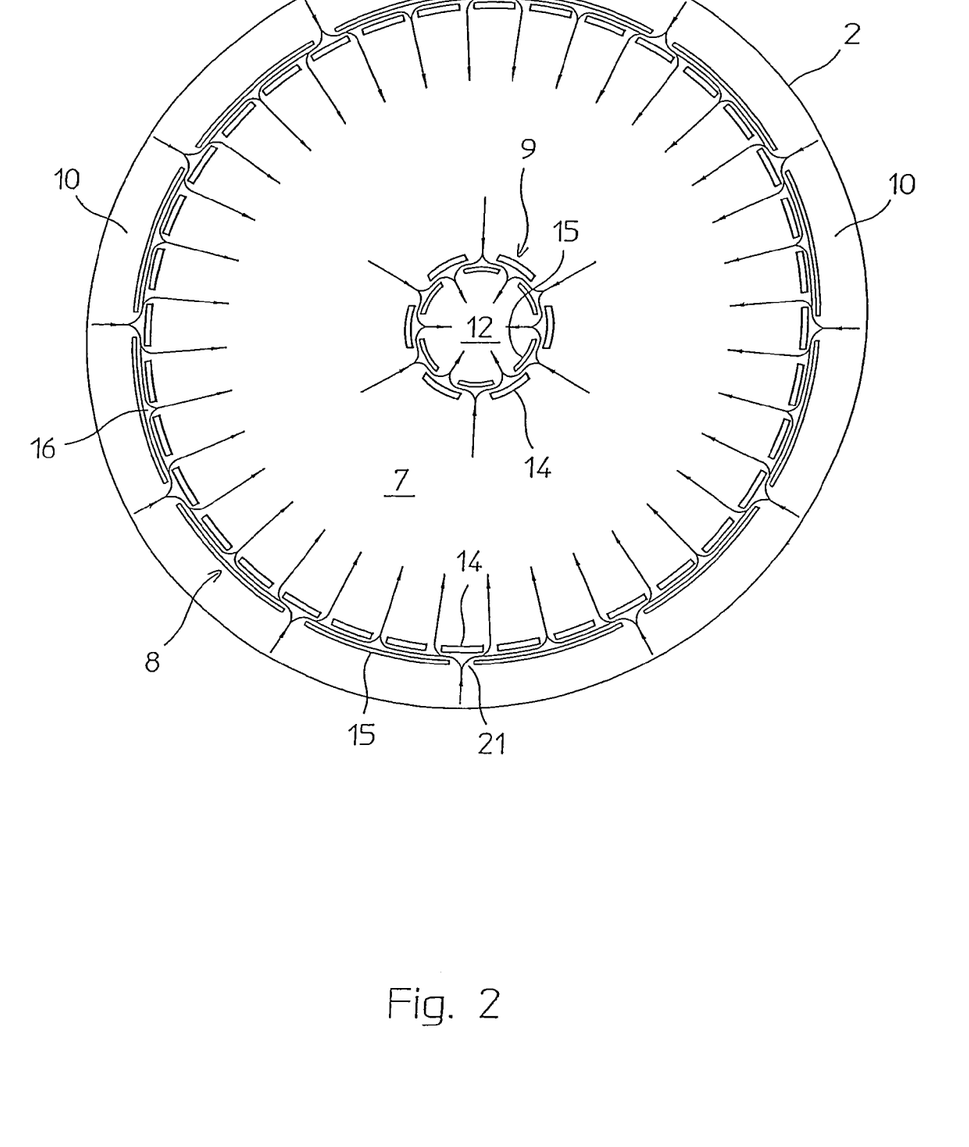

In the reactor 1 shown in FIGS. 1 and 2, the system of walls 8 for the inlet of gas is arranged close to the shell 2 whereas the system of walls 9 for the outlet of gas is arranged centrally to the reactor 1. Between the shell 2 and the system of walls 8 for the inlet of gas an annular interspace 10 is therefore defined to allow the catalytic bed 7 to be crossed radially by a portion of the gaseous flow of reactant gases.

The system of walls 9, on the other hand, is closed on top by a cover 11 not permeable to the gases, of known type. A chamber 12 is also provided, extending coaxially to the catalytic bed 7, between the system of walls 9 and the cover 11, for sending the reaction products coming out from such a catalytic bed to the opening 6 for the outlet of them from the reactor 1.

The dashed line 13 represented in FIG. 1 at the top end of the system of walls 8 for the inlet of gas, delimits the maximum level that can be reached by the catalyst inside the catalytic bed 7, and defines, together with the systems of walls 8 and 9 and with the bottom base plate 3, the reaction volume available in the reactor 1.

In FIGS. 1 and 2 the arrows indicate the various paths followed by the gases inside the reactor and in particular through the catalytic bed 7.

In accordance with the present invention, the system of walls 8 for the gas inlet as well as the system of walls 9 for the gas outlet, consists of two substantially cylindrical walls 14, 15, coaxial and spaced apart so as to form an annular interspace 16 between them.

More specifically (FIGS. 3 and 4), the wall 14 of each of the systems of walls 8 and 9 is in direct contact with the catalyst of the catalytic bed 7 for the lateral containment thereof and has a plurality of areas or portions 17 in the form of circumferential bands equipped with a plurality of axial slits 18 (i.e. extending parallel to the longitudinal axis of the shell 2) alternating with "full" areas or portions 19, in other words without slits, also in the form of circumferential bands. The slits 18 are of a size such as to allow the free passage through them of the gases but not of the catalyst of the catalytic bed 7. Regarding this, the slits 18 can have a width of between 0.3 and 2.5 mm, preferably between 0.5 and 1.1 mm.

Figure 3:
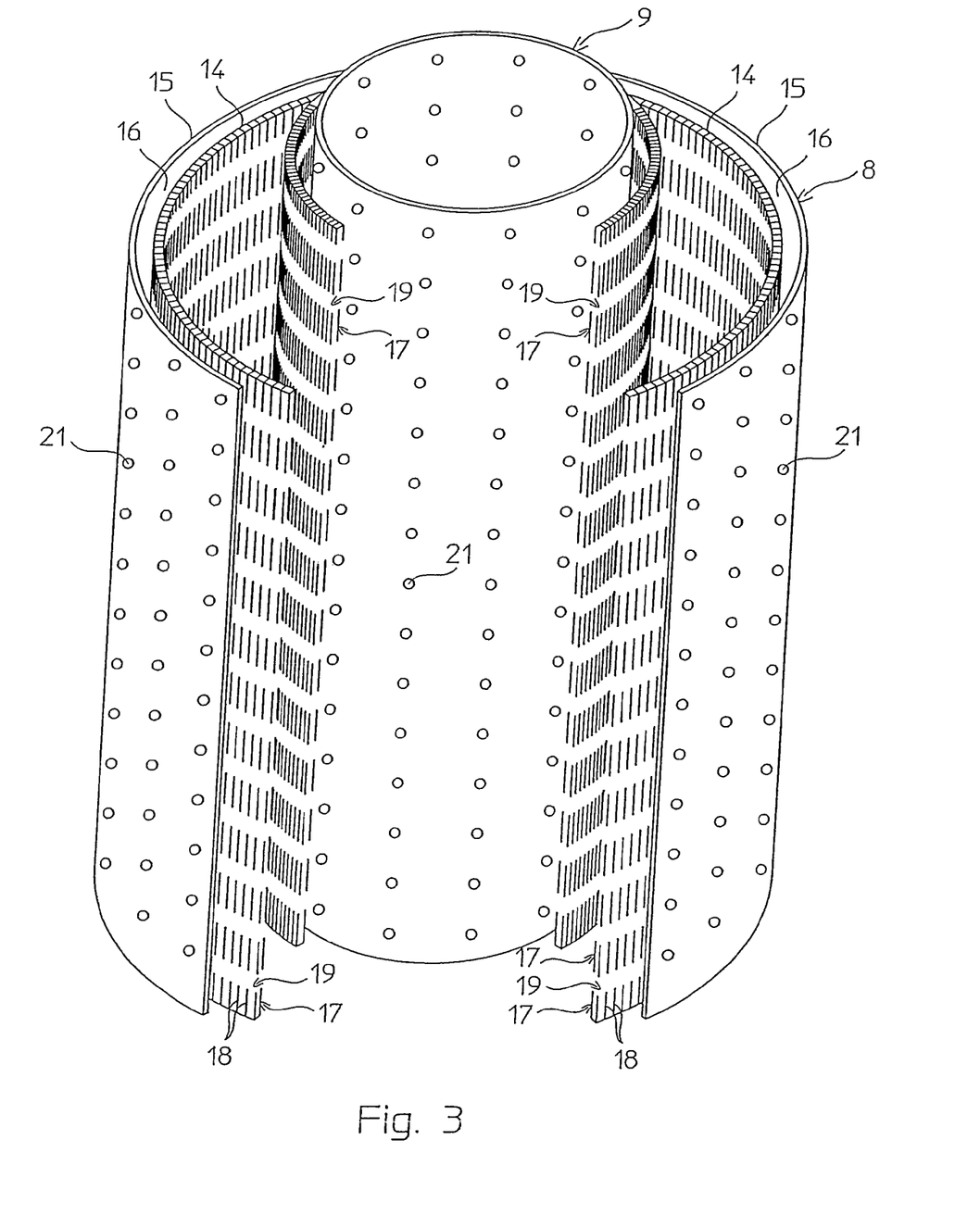
Figure 4:
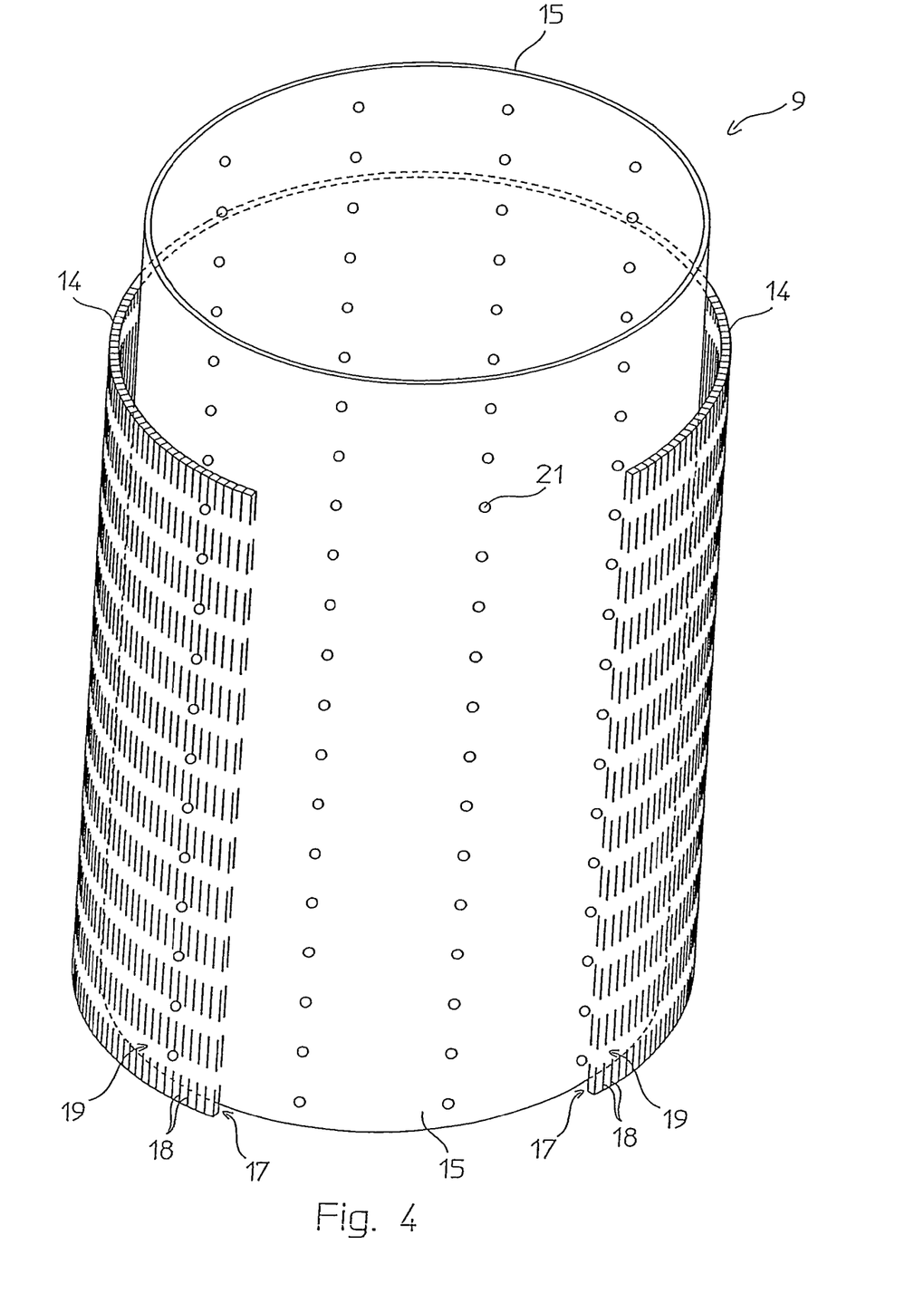

The slits 18, according to the invention, are obtained with a machining technique chosen from among milling, water cutting and electro-erosion.

For example, the slits are obtained with the chosen technique on the metal sheet intended to form the wall 14 (or a section thereof); said sheet is then subjected to possible finishing processes and then rolled to form the cylindrical wall 14 or part thereof.

The containment wall 14 is advantageously formed with a suitable thickness and material such as to have good mechanical strength during the operation of the reactor also under the effect of nitriding or other corrosion. As an example, in the case of a reactor for ammonia synthesis, the containment wall 14 can be formed with a thickness of between 1 and 10 mm, preferably between 3 and 6 mm and the material of said wall can be any material having ordinary resistance to nitriding like for example stainless steel. Regarding this, it should be noted that a wall made in this way, although subject to the surface nitriding effects typical of ammonia synthesis, said effects weakening it over time, maintains adequate mechanical strength during normal conditions of use of the reactor 1. It should also be noted that the containment wall 14 can be formed with a suitable thickness so as to act as well as for containment also as a mechanical support for the catalytic bed 7 through the respective "full" portions 19, i.e. without slits 8.

The distribution wall 15 of each of the wall systems 8 and 9, on the other hand, consists of a metal sheet of suitable thickness equipped with a plurality of holes 21 arranged, in the example shown here, in parallel axial groups in predetermined spaced apart relationship. More specifically, the holes 21 preferably face towards the areas or portions impermeable to the gases of the containment wall 14 so as to avoid the direct impact of the gases with the catalyst. In the example shown in the figures, such areas or portions impermeable to the gases consist of full areas or portions 19 between the slits 18 of the wall 14.

In the case of the system of walls 8 for the inlet of gas, the function of the wall 15 is essentially to promote the uniform distribution of the gases going into the catalytic bed 7 as shell be described more clearly hereafter. The wall 15 is made from a conventional material, for example stainless steel, and obtained through conventional processes with a suitable thickness according to requirements. Preferably, the distribution wall 15 is obtained with a suitable thickness to act as a mechanical support for the catalytic bed 7. The distribution wall 15 can also be equipped with spacers (not shown) to stably maintain the spaced relationship with the containment wall 14 under the effect of mechanical or thermal stresses during the operation of the reactor 1.

Preferably, each of the aforementioned walls 14 and 15 of a system of walls 8 or 9 is formed from longitudinal modules (not shown) of a suitable size to pass through a "manhole" (also not shown) of the reactor 1, said modules then being fixed together (for example welded or bolted) to form the corresponding walls.

As mentioned previously, the reactor 1 comprises a system of walls 8 for the inlet of the gases into the catalytic bed 7 and a system of walls 9 for the outlet of the gases from said catalytic bed, the walls 14 and 15 of which have been described up to now with regard to their structure. It should now be noted that, in the case of the system of walls 8 for the inlet of gas, the distribution wall 15 is arranged outside (going from the axis of the reactor towards the shell) with respect to the containment wall 14 of said system 8 of walls and forms with the shell 2 the interspace 10. In this way, the gases that cross the annular interspace 10 pass through the holes 21 of the distribution wall 15 and expand in the interspace 16 between the walls 14 and 15, thus obtaining a load loss that allows the same gases to be distributed uniformly in the catalytic bed 7 after having crossed the slits 18 of the wall 14 in contact with the catalyst.

On the other hand, in the system of walls 9 for the outlet of gas, the wall 15 is further in with respect to the containment wall 14. Therefore, the gases that radially cross said catalytic bed 7 come out from it by crossing the slits 18 of the wall 14 of the system 9 of walls and then, passing through the interspace 16, the holes 21 of the wall 15, to be collected in the chamber 12 and from here conveyed towards the outlet opening 6 of the reactor 1.

Figure 5:
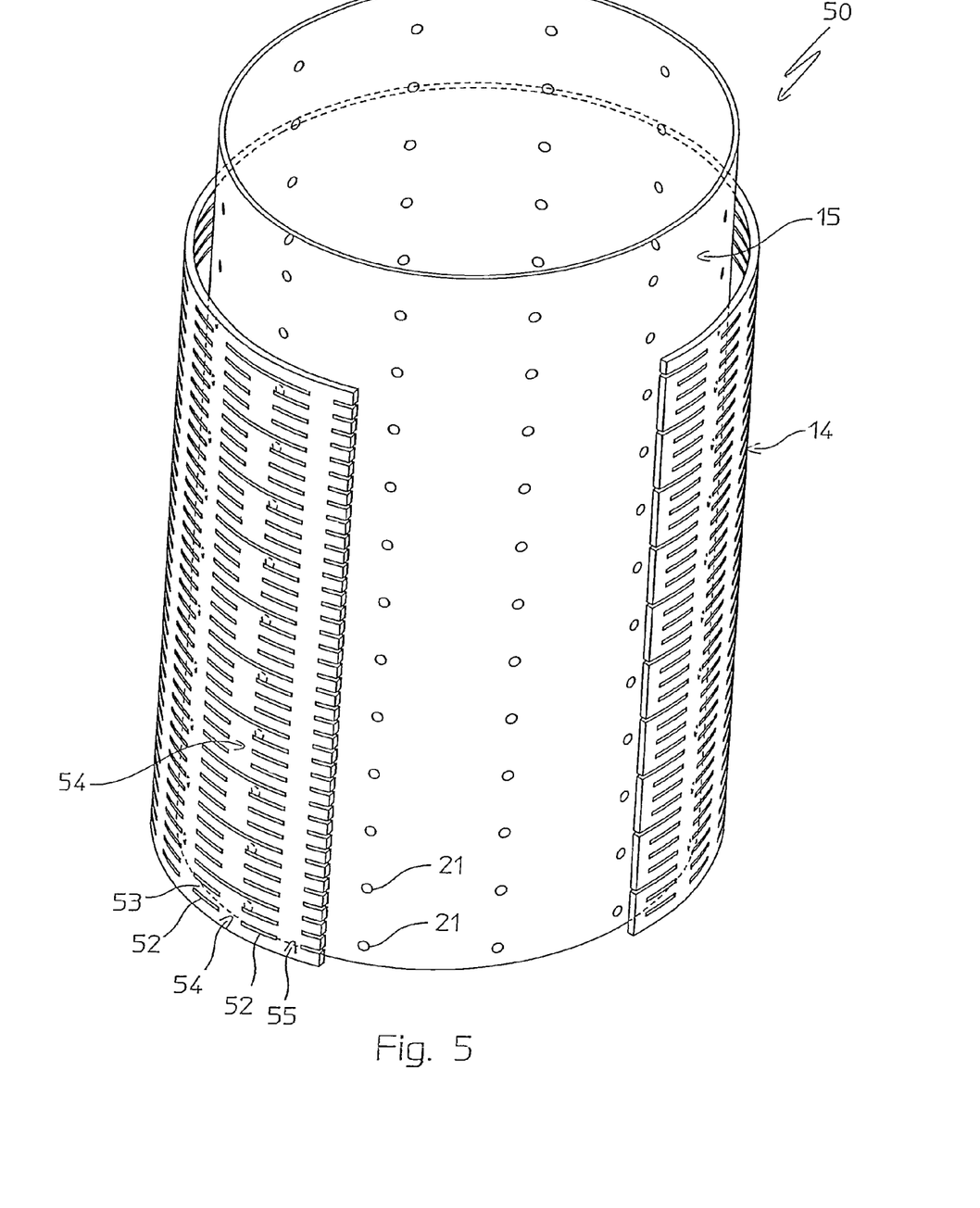

FIG. 5 shows a system of walls for catalytic beds of synthesis reactors according to a variant embodiment of the invention, said system being globally indicated with 50. The elements of the system of walls 50 that are structurally or functionally equivalent to corresponding elements of the systems of walls 8 and 9 described previously shall be attributed the same reference numerals.

The system of walls 50 shown in FIG. 5 (preferably obtained by milling) comprises a containment wall 14 and a substantially cylindrical wall 15, coaxial and spaced apart so as to form an annular interspace 16 between them. In the containment wall 14 it is possible to distinguish a plurality of slits 52 with a shorter arch, a plurality of slits 53 with a longer arch and portions 54 and 55 impermeable to the gases.

The system of walls 50 is suitable in particular for being applied onto the outlet side of a catalytic bed crossed by the gases with radial or axial-radial motion since the wall 15 is arranged inside the containment wall 14. Of course, by inverting the arrangement of the walls 14 and 15 with respect to each other, the system of walls 50 described above can also be applied to the gas inlet side into the catalytic bed.

Figure 6:
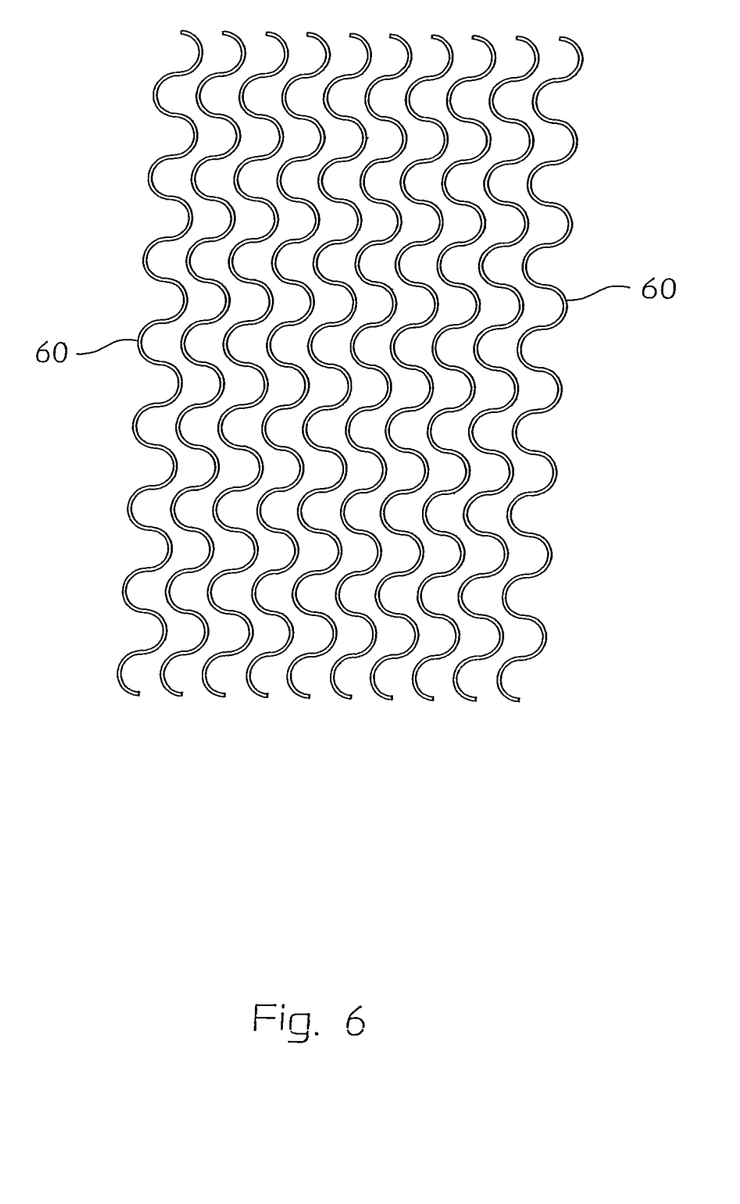

FIG. 6 schematically shows an alternative form and arrangement of slits on the containment walls 14 of wall systems according to the invention. In particular, FIG. 6 shows a plurality of slits 60 arranged axially and each being substantially coil-shaped. Said coil-shaped form is obtainable with water cutting or electro-erosion. Such a coil-shaped arrangement of slits advantageously offers a larger surface available for the crossing of the gases for the same mechanical strength of said containment wall 14.

Advantageously, the containment wall 14 has slightly flared and/or longer slits on one side as a result of the milling or water cutting processing procedure. In this case, the wall 14 is arranged with the surface having the longer and/or flared slits in direct contact with the catalytic bed 7. This further expedient reduces the obstruction of the slits themselves, facilitating the expulsion of possible catalyst grains or parts.

Of course, a man skilled in the art can bring numerous modifications and variants to the system of walls and to the reactor described above, all of which are covered by the scope of protection of the following claims.

The invention claimed is:

1. A system of walls for catalytic beds of chemical reactors comprising at least one containment wall of a catalytic bed, intended for direct contact with the same, said wall having:
    a plurality of gas-permeable portions; and
    a plurality of gas-impermeable portions,
        wherein each of said gas-permeable portions is equipped with a plurality of slits having a size such as to allow free passage of synthesis gases but avoid the free passage of catalyst through them,
        wherein the plurality of slits include slits which have a greater length in the longitudinal direction, on a side intended for direct contact with the catalyst with respect to a length of slits on an opposite side of the containment wall,
        wherein said plurality of slits are obtainable with a milling process wherein a milling disc is used, in such a way that the side of the containment wall in which the slits have greater length corresponds to the milling cutter entrance side while the opposite side of the containment wall corresponds to the milling cutter exit side,
    further comprising a distribution wall equipped with gas-permeable portions arranged in spaced relationship with said containment wall so as to create an interspace with it,
        wherein said gas-permeable portions of the distribution wall comprises holes made in said wall and facing towards said portions impermeable to the gases of the containment wall of said catalytic bed.

2. The system of walls according to claim 1, wherein said containment wall consists of a plurality of modules in which each module comprises said gas-permeable portions and/or said gas-impermeable portions.

3. The system of walls according to claim 1, wherein said slits are S-shaped.

4. The system of walls according to claim 1, wherein said slits have a width of between 0.3 and 2.5 mm.

5. The system of walls according to claim 4, wherein said slits have a width of between 0.5 and 1.1 mm.

6. A system of walls for catalytic beds of chemical reactors comprising at least one containment wall of a catalytic bed, intended for direct contact with the same, said wall having a plurality of gas-permeable portions and a plurality of gas-impermeable portions, each of said gas-permeable portions being equipped with a plurality of slits having a size such as to allow free passage of synthesis gases but avoid the free passage of catalyst through them, wherein said containment wall is equipped with slits which are flared so as to be narrower on one side of said containment wall and which are obtainable with a water cutting process, further comprising a distribution wall equipped with gas-permeable portions arranged in spaced relationship with said containment wall so as to create an interspace with it, wherein said gas-permeable portions of the distribution wall comprises holes made in said wall and facing towards said portions impermeable to the gases of the containment wall of said catalytic bed.

7. The system of walls according to claim 6, wherein said containment wall consists of a plurality of modules in which each module comprises said gas-permeable portions and/or said gas-impermeable portions.

8. The system of walls according to claim 6, wherein said slits are S-shaped.

9. The system of walls according to claim 6, wherein said slits have a width of between 0.3 and 2.5 mm.

10. The system of walls according to claim 9, wherein said slits have a width of between 0.5 and 1.1 mm.

11. A reactor for the heterogeneous synthesis of chemical compounds comprising;

a shell closed at opposite ends by respective base plates;
an opening for the inlet of synthesis gas;
an opening for the outlet of the reaction products;
at least one catalytic bed; and
at least one system of walls for the containment of said at least one catalytic bed, said walls comprising at least one containment wall of the catalytic bed, intended for direct contact with the same, said wall having:
a plurality of gas-permeable portions; and
a plurality of gas-impermeable portions,
wherein each of said gas-permeable portions is equipped with a plurality of slits having a size such as to allow free passage of synthesis gases but avoid the free passage of catalyst through them, wherein the plurality of slits include slits which have a greater length in the longitudinal direction, on a side intended for direct contact with the catalyst with respect to a length of slits on an opposite side of the containment wall, wherein said plurality of slits are obtainable with a milling process wherein a milling disc is used, in such a way that the side of the containment wall in which the slits have greater length corresponds to the milling cutter entrance side while the opposite side of the containment wall corresponds to the milling cutter exit side, and a distribution wall equipped with gas-permeable portions arranged in spaced relationship with said containment wall so as to create an interspace with it, wherein said gas-permeable portions of the distribution wall comprises holes made in said wall and facing towards said portions impermeable to the gases of the containment wall of said catalytic bed.

12. The reactor according to claim 11 wherein said containment wall of the catalytic bed is arranged so that the side with longer slits is in contact with the catalytic bed.

13. A reactor for the heterogeneous synthesis of chemical compounds comprising;

a shell closed at opposite ends by respective base plates;
an opening for the inlet of synthesis gas;
an opening for the outlet of the reaction products;
at least one catalytic bed; and
at least one system of walls for the containment of said at least one catalytic bed comprising at least one containment wall of the catalytic bed, intended for direct contact with the same, said wall having a plurality of gas-permeable portions and a plurality of gas-impermeable portions, each of said gas-permeable portions being equipped with a plurality of slits having a size such as to allow free passage of synthesis gases but avoid the free passage of catalyst through them, wherein said containment wall is equipped with slits which are flared so as to be narrower on one side of said containment wall and which are obtainable with a water cutting process, further comprising a distribution wall equipped with gas-permeable portions arranged in spaced relationship with said containment wall so as to create an interspace with it, and wherein said gas-permeable portions of the distribution wall comprises holes made in said wall and facing towards said portions impermeable to the gases of the containment wall of said catalytic bed.

14. The reactor according to claim 13 wherein said containment wall of the catalytic bed is arranged so that the side with flared slits is in contact with the catalytic bed.

* * * * *